Patented Jan. 14, 1941

2,228,366

UNITED STATES PATENT OFFICE 2,228,366

PROCESS OF PURIFYING CRUDE PHENOLS

Carl Rumscheidt and Hinrich Havemann, Leuna, and Otto Mueller, Ludwigshafen - on - the-Rhine, Germany, assignors to I. G. Farbenindustrie Aktiengesellschaft, Frankfort-on-the-Main, Germany No Drawing. Application June 16, 1939, Serial No. 279,482. In Germany July 9, 1938

3 Claims. (Cl. 202—57)

The present invention relates to a process of purifying crude phenols.

In the working up of mineral and brown coal tar oils, and also in the purification of waste waters containing phenols from coke oven, low temperature carbonization and hydrogenation operations, crude phenols are obtained. These cannot be sufficiently purified by fractional distillation because the contaminating accompanying substances have the same or a similar vapour pressure to the phenols themselves. Moreover, even in so far as a separation is possible by distillation, in view of the small amounts of impurities the distillation costs are high while the efficiency of the distillation plant is small.

It has therefore already been proposed to carry out a purification by chemical methods before the distillation. For purifying crude phenols obtained from mineral coal tar oil and coke oven waste aqueous liquors, they have been treated with caustic soda solution, whereby the phenols are dissolved as phenolates, while the impurities remain undissolved, as for example hydrocarbons and bases, and are then distilled off with steam. The phenols are set free from the purified alkaline solution by means of carbon dioxide or sulphuric acid and converted into commercial goods by distillation. The process is expensive in view of the chemical reagents used and the large apparatus necessary.

Furthermore the process is not useful for the purification of crude phenols from brown coal tar oils or from waste aqueous liquors originating from low temperature carbonizations or hydrogenations. Some of the impurities contained in the said crude phenols are not removed by the said treatment and impart to the refined phenols properties which exclude their use for many purposes.

While with the aid of sulphuric acid the bases, as for example pyridine bases, are removed, the other impurities are only partly removed thereby.

We have now found that the impurities, regardless of the source from which the crude phenols are obtained or the pretreatment to which they may have been subjected, can be removed therefrom to a far-reaching extent by causing inorganic halides having a condensing action, as for example boron fluoride, aluminium chloride or zinc chloride, to act thereon for some time, if desired at elevated temperature, then if necessary neutralizing the acid accompanying substances of the phenols, i. e., not the phenols themselves, in the reaction mixture or in its distillate with non-volatile alkaline substances and then distilling off the phenols. If the crude phenols have been well fractionated before the addition of the condensing substances, the after-treatment with alkaline substances may be omitted.

By the said treatment, there are formed, by condensation and/or polymerization of the impurities, products having a considerably higher boiling point than the phenols, so that the separation of the pure phenols is rendered possible by distillation. In order to save condensing agent, it is advantageous to keep the water content of the crude phenols low. The action of the neutralization probably rests on the binding of the organic acids originally contained in the crude phenols or freshly formed and the mineral acids formed by splitting off from the condensing agents. In some cases a pretreatment with small amounts of caustic alkali solution may be advantageous before the addition of the condensing agents. In all cases, however, it is important to use considerably smaller amounts of caustic alkali than are necessary for the conversion of the phenols into phenolates.

The purified phenols are distinguished by great stability to light and a pure odor. Whereas the phenols purified by other methods dissolve in caustic soda solution to give a deep yellow to brown coloration, or subsequently become very dark, solutions of the products obtained according to this invention are pale and do not darken subsequently.

The following examples will further illustrate how this invention may be carried out in practice but the invention is not restricted to these examples. The parts are by weight.

Example 1

A product having a setting point of at least 34° C. is obtained by far-reaching fractionation of crude phenols. 100 parts of this fraction are melted with an addition of from 1 to 2 parts of water and then crystallized by cooling while agitating and centrifuged. The resulting phenol crystals are fused and 1 part of a 72 per cent zinc chloride solution is added thereto. After a reaction time of several days at about 40° C., the product is fractionated in a column. A pure phenol of excellent quality is obtained.

Example 2

Crude phenols obained by extraction from the aqueous liquor obtained in a brown coal low temperature carbonization are distilled in vacuo with an addition of small amounts of sulphuric acid.

The first runnings and residue are discarded. 100 parts of the main fraction have 1 part of aluminium chloride added thereto and the mixture is allowed to stand for 24 hours at room temperature. 1.2 parts of sodium hydroxide in the form of a 75 per cent solution are then added and, after a short reaction time, the phenols are distilled off in vacuo. The colorless distillate is stable to light and dissolves in caustic soda solution to give a colorless solution.

*Example 3*

Crude phenols obtained by extraction from aqueous liquor obtained in a brown coal low temperature carbonization are subjected to a preliminary distillation. 1 part of aluminium chloride is added to 100 parts of the main fraction. After allowing to stand for 12 hours at room temperature, the phenols are distilled off in vacuo. To 100 parts of this distillate there are added 2 parts of sodium hydroxide in the form of a 75 per cent solution and, after a short reaction time, the phenols are distilled off in vacuo. The resulting colorless distillate is stable to light and dissolves in caustic soda solution to give a colorless solution.

*Example 4*

To 100 parts of the main fraction of crude phenols obtained according to Example 2 1 part of boron fluoride is added. After reaction for 24 hours at room temperature, 2 parts of sodium hydroxide are added as a 75 per cent solution and the phenols are distilled off in vacuo. The resulting colorless distillate dissolves in caustic soda solution to give a colorless solution.

*Example 5*

0.2 part of sodium hydroxide in the form of a 75 per cent solution is added to 100 parts of the main fraction of crude phenols obtained according to Example 2 and heated for 2 hours at 100° C. 1 part of zinc chloride is then added and the mixture kept at 100° C. for 4 hours. 0.7 part of sodium hydroxide is then added to the mixture in the form of a 75 per cent solution and the phenols are distilled off after some time. The distillate is colorless and dissolves in caustic soda solution giving only a slight coloration.

If the addition of caustic soda solution after the treatment with condensing agents be omitted, a distillate which is contaminated by acids and other impurities and which has a yellow to red color is obtained which dissolves in caustic soda solution to give a dark coloration.

What we claim is:

1. A process for purifying crude phenols which comprises acting with a small amount of an inorganic halide having a condensation action on the crude phenols and then separating the purified phenols by fractional distillation from the higher boiling reaction products.

2. A process for purifying crude phenols which comprises acting with a small amount of an inorganic halide having a condensation action on the crude phenols, then adding an alkaline substance in an amount considerably smaller than is necessary for the conversion of the phenols into phenolates and separating the purified phenols by fractional distillation.

3. A process for purifying crude phenols which comprises acting with a small amount of an inorganic halide having a condensation action, selected from the group consisting of boron fluoride, aluminum chloride and zinc chloride, on the crude phenols, then adding an amount of an alkaline substance approximately corresponding to the amount of halogen previously added in the halide, and separating the purified phenols by fractional distillation.

CARL RUMSCHEIDT.
HINRICH HAVEMANN.
OTTO MUELLER.